(12) United States Patent
Walton et al.

(10) Patent No.: US 12,542,006 B2
(45) Date of Patent: *Feb. 3, 2026

(54) MACHINE FUNCTION ANALYSIS WITH RADAR PLOT

(71) Applicant: Softing, Inc., Knoxville, TN (US)

(72) Inventors: Keith A. Walton, Jonesborough, TN (US); Kai T. Bouse, Loudon, TN (US)

(73) Assignee: Softing, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,433

(22) Filed: Dec. 15, 2023

(65) Prior Publication Data

US 2024/0112505 A1 Apr. 4, 2024

Related U.S. Application Data (63) Continuation of application No. 17/979,521, filed on Nov. 2, 2022, now Pat. No. 11,881,059.

(60) Provisional application No. 63/275,043, filed on Nov. 3, 2021.

(51) Int. Cl.
*G06F 11/00* (2006.01)
*G06F 11/30* (2006.01)
*G06F 17/14* (2006.01)
*G07C 3/12* (2006.01)

(52) U.S. Cl.
CPC ............. *G07C 3/12* (2013.01); *G06F 17/142* (2013.01)

(58) Field of Classification Search
CPC ........ G06F 11/00; G06F 11/30; G06F 11/348; G06F 11/3495; G06F 11/88; G06F 11/885; G06F 2207/00
USPC .......................................................... 377/16
See application file for complete search history.

(56) References Cited

U.S. PATENT DOCUMENTS 11,881,059 B2 * 1/2024 Walton ................. G07C 3/08

* cited by examiner

*Primary Examiner* — Hai L Nguyen
(74) *Attorney, Agent, or Firm* — Frederick L. Tolhurst; Dentons Cohen & Grigsby, P.C.

(57) ABSTRACT

A system and method for detecting abnormal operating conditions in a machine through the analysis and comparison of radar areas after the transformation of waveform data collected from machine parts. The system and method may detect abnormal operating conditions at times when the machine under evaluation remains fully operational in its intended working environment. The system and method may identify abnormal machine function at a point in the machine wear cycle when an abnormal function is not apparent to a human observer.

20 Claims, 6 Drawing Sheets

MACHINE FUNCTION ANALYSIS WITH RADAR PLOT

CROSS-REFERENCE TO RELATED APPLICATIONS

This application is a continuation of U.S. patent application Ser. No. 17/979,521, filed on Nov. 2, 2022, now U.S. Pat. No. 11,881,059, which issued on Jan. 23, 20024, entitled MACHINE FUNCTION ANALYSIS WITH RADAR PLOT, which claims priority to and the benefit of U.S. Provisional Patent Application No. 63/275,043, filed on Nov. 3, 2021, entitled MACHINE FUNCTION ANALYSIS WITH RADAR PLOT, which is expressly incorporated herein by reference in its entirety.

FIELD OF THE INVENTION

This disclosure generally relates to the field of machine function analysis, and more particularly, identifying and diagnosing abnormal operating conditions in machines.

BACKGROUND

Various methods and devices have been developed for the purpose of identifying functional abnormalities in various types of mechanical devices. In some cases, hand-held devices or permanently mounted sensors have been used to detect and record vibrations in machines. The vibrational data is then analyzed according to established techniques. Often, such methods and devices require the expertise of specially trained technicians that have the experience and training to enable them to understand and use the same. In some cases, the prior art devices collect and record data that is then analyzed by a trained technician. Other devices simply trigger an alarm when certain thresholds of vibration amplitude or frequency have been exceeded.

Such prior systems and methods are subject to misinterpretation, computational errors, and other mistakes and misjudgments of technicians. Also, such prior systems and methods may not achieve an accurate result because the timing of monitoring devices does not accommodate the inspection schedules of inspectors or the sampling schedules of mechanical surveillance mechanisms.

The prior art includes devices and procedures wherein machines can be inspected through regimens of regular inspection and maintenance, but only at times when the machine is not in service. Such devices and procedures include disassembly and inspection of the machine components. However, such devices and procedures generally have not enabled the identification of abnormal machine function at its incipient stages, particularly at times when the machine is operating in its normal working capacity and environment. Such prior devices and methods often require taking the machine out of service either according to a schedule for inspection or maintenance or after the machine defect has become apparent due to the obvious loss of function or the compromise of machine performance.

In many cases, machines develop minor defects that are not immediately apparent to observers or established monitoring devices or procedures. However, continued operation of the machine under such conditions results in material wear or damage to the machine that could be avoided if the defect, wear, or minor damage causing the abnormal behavior could be identified and remedied at an early stage in the wear process.

Accordingly, there is a need for systems and methods for promptly and reliably detecting defective or abnormal machine operation at an early point in the development of the abnormal machine behavior.

BRIEF SUMMARY

An embodiment of the present invention enables the identification of abnormal machine operation at an incipient stage. In this way, the presently disclosed invention provides a basis for avoiding the aforementioned difficulties through the early identification of abnormalities and malfunctions resulting from undiagnosed and unremedied machine wear, defect, or damage.

The presently disclosed systems and methods may make such identifications and diagnoses at times when the machine under evaluation remains fully operational in its intended working environment. The presently disclosed invention enables normally skilled machine operators to recognize the early identification and diagnosis of compromised machine operations or functions without the need for the special knowledge, training, or experience of the operator and without the intervention of specially trained technicians.

The presently disclosed systems and methods also may identify abnormal machine function at a point in the machine wear cycle when an abnormal function is not apparent to a human observer or even to prior art machine monitoring devices that are intended to identify abnormal machine functions and behaviors.

According to embodiments, the presently disclosed methods and systems analyze and identify operating abnormalities in machines by monitoring operating features of a machine in the form of waveform data, processing the waveform data into Fast Fourier Transform radar plots, calculating the radar area, and monitoring changes in radar area from baseline conditions to determine if there is an abnormal operating condition or the machine is operating normally.

The presently disclosed invention may be embodied as a system, method, or computer program product embodied in any tangible medium of expression having computer useable program code embodied in the medium.

DESCRIPTION OF THE DRAWINGS

It is to be understood that both the foregoing summary and the following drawings and detailed description may be exemplary and may not be restrictive of the embodiments of the invention as claimed. Certain details may be set forth in order to provide a better understanding of various features, aspects, and advantages of the invention. However, one skilled in the art will understand that these features, aspects, and advantages may be practiced without these details. In other instances, well-known structures, methods, and/or processes associated with methods of practicing the various features, aspects, and advantages may not be shown or described in detail to avoid unnecessarily obscuring descriptions of other details of the invention.

The presently disclosed invention may be better understood by reference to the accompanying drawing sheets, in which.

DETAILED DESCRIPTION

The presently disclosed invention provides improved analysis and identification of operating abnormalities of machines by detecting multiple operating features of a machine and combining those changes in machine function in such a way that they are additive and form a signal that the machine is operating abnormally.

The presently disclosed invention may monitor one or more parts of a machine. Even though the operating features measured individually may be too slight or modest to reliably identify an abnormal function or condition, the presently disclosed invention combines multiple operating features wherein they are viewed or analyzed collectively to identify at least one state of abnormal operation. The exploitation of such features in this cumulative way supports a more sensitive threshold for detection of an abnormal condition and an early identification of its cause at an incipient stage. Thus, the presently disclosed invention may provide near-real time detection of an abnormal condition in a machine.

The presently disclosed invention provides a method 1 (FIG. 1) for identifying abnormal behavior of a machine while the machine is in operation. The method 1 may monitor multiple features of an operating machine and generate a monitoring signal 2 in the form of waveform data.

Figure 1:
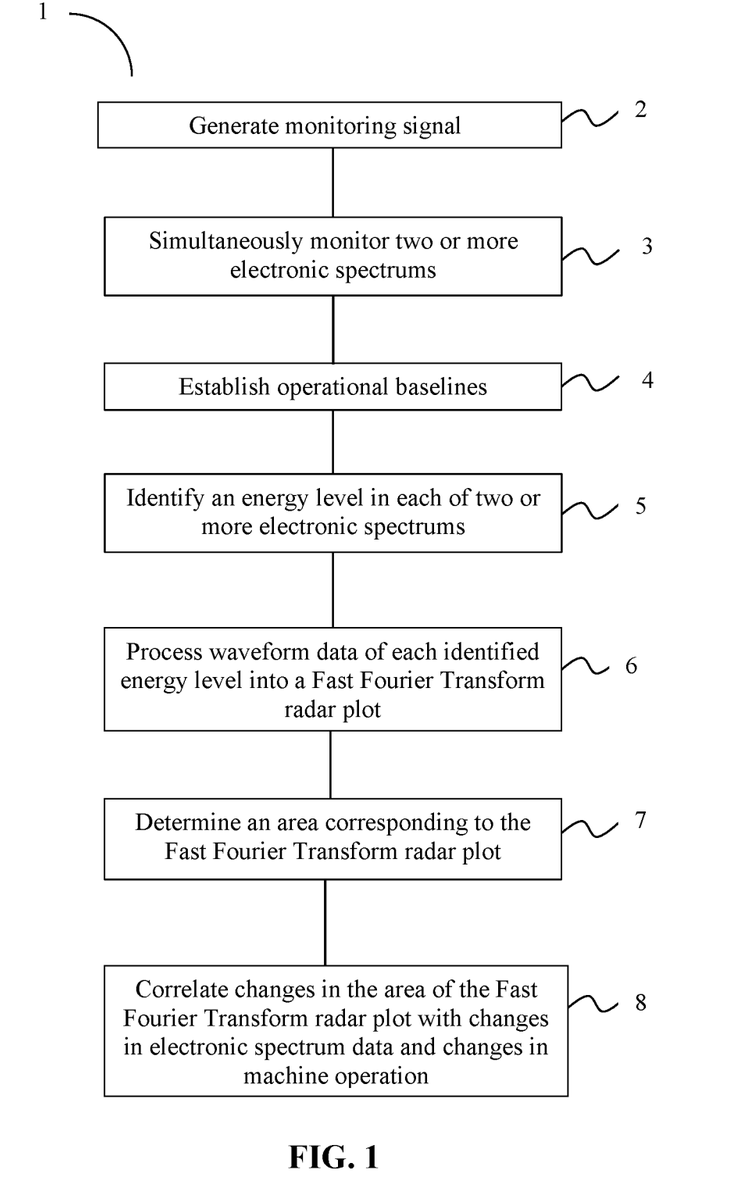
FIG. 1 is a flow chart of a method for detecting abnormal operation of a machine, in accordance with an embodiment of the presently disclosed invention described herein.

The presently disclosed method may identify and simultaneously monitor respective "bands" in a spectrum as "smart regions" 3. The smart region is a band in the spectrum that is customized according to respective machine components. The spectral bands are associated with one measurement or one feature in the machine. The bands are customized—i.e., varied according to width—to highlight specific potential problems that may occur in a machine. The energy in the smart region (i.e., a customized band) is determined and the energy level is established as a radar band point. The points corresponding to each smart region or customized band may be plotted to form the electronic equivalent of a closed pattern that defines an area for a radar plot of the type wherein one or more groups of values are plotted over multiple common variables.

The method 1 may then establish operational baselines 4. The waveform data that supports a baseline definition of the customized bands or smart regions is taken from actual operation of the machine during its initial operation or at a time before wear caused by operation or other factors could reasonably be expected. Typically, the baseline waveform data can be established in several hours or days of normal operation of the machine.

After establishing operational baselines 4, the method 1 identifies an energy level in each of two or more electronic spectrums 5 corresponding to the waveform data taken from respective parts of the machine under observation. As the machine continues to operate, it experiences small changes within and among its various parts in a manner common in the operation of mechanical devices. Such variations result in corresponding changes to the smart region or regions of the spectrum that is associated with the respective part. These changes in the smart regions cause the value of the corresponding radar band point to be greater or lesser depending on the nature of the mechanical change in the machine. In turn, the change in the radar band point varies the electronic representation that corresponds to the area of the radar plot.

More specifically, method 1 processes waveform data of each identified energy level through a Fast Fourier Transform (FFT) computation to establish a radar band point. Such radar band points collectively define plot 6. The method 1 periodically samples the smart regions of the spectrum and determines an area corresponding to the FFT radar plot 7. The method then monitors changes in the electronic expression that corresponds to the area of the consequent radar plot. Such monitoring of waveform data may be according to a suitable electronic interface. In an embodiment of the invention, processing of monitored data may be executed on any commercially available computer such as Linux OS module on a Rockwell Automation 1756 Compute module. In another embodiment, the monitoring may be executed on a Linux OS virtual machine running in the cloud, any networked Linux OS machine, or on a Linux OS industrial computer. In other embodiments, a computer operating system may include, but is not limited to, Linux, Windows, UNIX, or MAC OS. In an embodiment of the presently disclosed invention, the forgoing processing devices or any other electronic, computation platform of a type designed for electronic processing of digital data as herein disclosed may be used. The disclosed systems and method avoids the need for a vibration analyst or other human to intervene in the monitoring stage and thereby avoids potential errors due to human misjudgments.

In this way, an electronic expression that represents the equivalent of the area of the FFT radar plot may be precisely monitored according to size increments that are relatively small in comparison to size increments that are within the capability of human observation. The method and system of the presently disclosed invention may monitor and determine an electronic expression that corresponds to the area of the FFT radar plot of at least one feature of a machine at least every 15 minutes or within a timeframe reasonably expected to reliably monitor machine function. The minimum sampling rate depends on how quickly the monitoring equipment is capable of acquiring data as well as the number of sensors. In one embodiment, the method may compute an electronic expression that corresponds to a radar plot every 10 to 15 seconds or as fast as the computational engine of the data acquisition equipment may reliably work. This provides the presently disclosed invention with a basis to more finely granulate the FFT radar plot area equivalent and thereby enable a higher degree of precision in defining the FFT radar plot area. This also enables faster recognition and signal processing according to changes in the FFT radar plot area.

In this way, slight variations in the energy of the FFT radar plot bands are collected in additive combinations to generate the electronic equivalent of the radar plot area as the radar plot area is monitored for the occurrence of such changes. In one embodiment, the presently disclosed invention may monitor multiple spectral features and present them in respective radar plot presentations in electronic form.

While a preferred embodiment described herein uses "FFT" or Fast Fourier Transforms to determine the radar band points that define the electronic expression that is equivalent to the radar plot, other methods or techniques the presently disclosed invention may employ alternative steps to populate the radar bands that define the radar area. Such steps include, but are not limited to, processes according to Fourier Transforms, Laplace Transforms, spectral trend parameters, waveform trend parameters, temperature measurements across a machine, and data derived from the waveform data such as peak to peak level, crest level, and other waveform metrics or parameters.

In one embodiment of the presently disclosed invention, changes in the electronic equivalent to the area of the radar plot are equated to mechanical variation in the machine. The method 1 correlates changes in the area of the FFT radar plot with changes in electronic spectrum data and changes in machine operation 8. The controlled, fine granularity of the size increments within the electronic equivalent of the FFT radar plot and the fast detection of changes to the electronic equivalent of the area of the FFT radar plot enable the presently disclosed systems and methods to identify machine wear faster and more precisely than known in the prior art without the need for special operator training or human intervention for this purpose.

The presently disclosed systems and methods do not require publication of the FFT radar plots in a visual format that can be observed by a human. However, in an embodiment where the image of the FFT radar plot is desirable, an electronic version of the FFT radar plot may be applied to a viewer or display that is capable of generating the desired visual, graphical representation. The graphical representation may include a FFT radar plot, a radar ripple plot, a 3-Dimensional radar plot, or any other graphical representation known in the art.

The systems and methods of the presently disclosed invention establish limits in the FFT radar plots that correspond to at least one operating state of a machine. An operating state may comprise a normal or abnormal condition, wherein abnormal conditions include, but are not limited to, motor faults (generic rotor problem, broken or cracked rotor bar, etc.), pump faults (problems with pump vanes, impellers, or gears, flow problems, etc.), fan faults (problems with fan blades or shroud, fan flow, etc.), gearbox faults (tooth wear, eccentricity backlash, tooth misalignment, cracked, chipped, or broken teeth, etc.), balance and alignment faults (misalignment, unbalance, etc.), belt drive faults (worn, loose, or misaligned belts, belt pulley misalignment, eccentric pulleys, belt drive slipping, etc.), impacting (crest factor) faults (roller bearing wear, cavitation and gear tooth wear, etc.), bearing faults (wear or clearance of journal/sleeve bearing, oil whirl in journal/sleeve bearing, rolling element bearing fault, etc.), looseness faults (mechanical looseness or soft foot, etc.), and generic faults (high synchronous energy, high non-synchronous energy, high sub-syncrhonous energy, high raised floor, etc.). The systems and methods of the present invention establish at least two alarm limits. When a radar plot area reaches the alarm limit or threshold amount, the systems and methods of the present disclosure will notify a user of an abnormal operating condition. The number of alarm limits of the presently disclosed systems and methods are established according to any criterion that the user may choose to apply. One example comprises at least two alarm limits, one alarm limit wherein the machine is operating properly and one alarm limit where there is an abnormal operating condition. The methods and systems of the present disclosure may, without the need for human intervention, establish alarm limits based on variations in the baseline data collected during the learning period wherein the machine is operating properly, and waveform data is collected and stored.

The alarm limits of the presently disclosed systems and methods are adaptive and machine specific, as there are no industry standards for the manner or significance of alarm limits. Therefore, in one embodiment, the systems and methods of the presently disclosed invention may establish different escalating alarm limits dependent on the type of machine or machine component.

When an alarm limit has been reached, the methods and systems of the present invention may notify a user that the machine has reached an abnormal operating condition. In one embodiment, the systems and methods may alert other control systems such as industrial automation systems, which may shut down the machine or notify a user that repair is necessary.

Currently, the prior art focuses on identifying abnormal operating conditions in a machine based on a single measurement. For example, current plotting packages are designed to allow vibration analysts to examine if there is a problem that can be identified with a single measurement. However, a single radar plot, by itself, cannot provide any useful information on the condition of a machine. Therefore, radar plots have not been used for that purpose in the prior art. However, the method and system of the presently disclosed invention enables the determination of abnormal machine operation by measuring the change in the shape and area of a radar plot of multiple machine components over time. Unlike current techniques, the method of the presently disclosed invention provides real-time and early detection of abnormal machine behavior.

In one embodiment, the methods and systems of the presently disclosed invention may monitor at least two parts of a machine simultaneously. The waveform data collected is converted and combined to form the radar areas. The systems and methods may utilize the radar area of one specific measurement input of one machine part in order to determine whether there is an abnormal operating condition in the overall machine. In another embodiment, the systems and methods of the present invention may add together the radar areas of the at least two machine parts in order to view the entire machine and determine whether there is an abnormal operating condition. By adding the radar areas together, the systems and methods of the present invention may monitor and view the combined effect of small changes in machine function, allowing for the early identification of abnormal machine conditions. Thus, the systems and methods of the present disclosure may measure at least two different parts or sources on a machine and may utilize the data collected from them to identify a problem in just one of the parts or sources.

Figure 2:
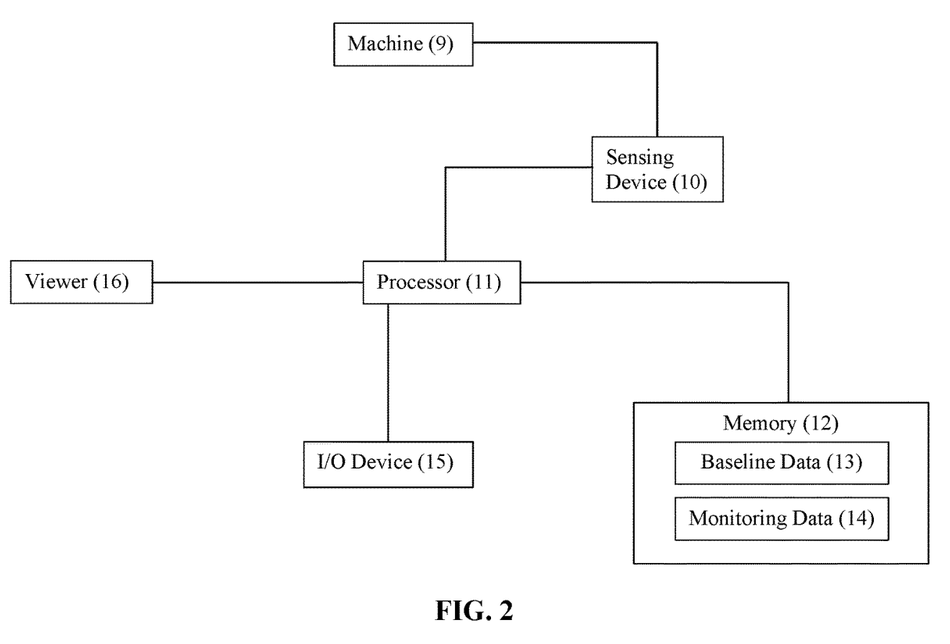
FIG. 2 is a block diagram of a system for detecting abnormal operation of a machine, in accordance with an embodiment of the presently disclosed invention described herein.

FIG. 2 is a block diagram that schematically illustrates a system of the presently disclosed invention for identifying abnormal behavior of a machine. The system may comprise a machine 9 and at least one sensing device 10 connected to at least one part of a machine. The system may further comprise an I/O device 15.

The presently disclosed invention provides systems for identifying abnormal behavior of a machine 9 while the machine 9 is in operation. The system may comprise a sensing device 10 that monitors operating behaviors of a machine while the machine is in operation. A sensing device may measure vibration, sound, pressure, temperature, or other conditions wherein an abnormal machine condition may be detected. According to some embodiments, a sensing device 10 may comprise an accelerometer, drive control, torque feedback, or any other device that generates a vibrational signature or desired machine measurement.

The sensing device 10 of the presently disclosed invention monitors the operating behavior of a machine 9 at times when the machine is in operation and generates waveform data. The sensing device 10 may comprise an input signal wherein waveform data is transmitted. The input signal may comprise vibrational measurements, fiberoptic signals, or visual changes as seen by a camera. The waveform data collected may comprise electronic spectra or data collected from the ultraviolet, visual, or infrared optical regions.

The sensing device 10 inputs waveform data to a processor 11. The processor 11 may be, for example and without limitation, a microprocessor, a microcontroller, or some other suitable processing device that interfaces with memory 12 (which may be separate from or included as part of processor 11). The memory 12 may also employ cloud-based memory. In one embodiment, the system may connect to a base station that includes memory and processing capabilities.

According to one embodiment, waveform data collected during real-time machine operation by the sensing device 10 may be stored in the memory 12 of the system of the presently disclosed invention. Memory 12 may also have stored therein baseline data 13, which may comprise waveform data collected during proper machine 9 operation to establish normal operating data. Memory 12 may further have stored therein monitoring data 14, which may comprise any waveform data collected while machine 9 is in operation after the baseline data 13 has been collected and stored in memory 12.

Memory 12 has stored therein a number of routines that are executable by processor 11. The processor 11, in communication with the memory 12 and the sensing device 10, may be configured to Fast Fourier Transform the waveform data from the baseline data 13 and monitoring data 14 to populate a radar point in an FFT radar plot. Other methods the processor 11 may use to populate the radar points include but are not limited to: Fourier Transforms, Laplace Transforms, spectral trend parameters, waveform trend parameters, temperature measurements across a machine, and data derived from the waveform data itself such as peak to peak level, crest level, and other parameters of waveform data.

Processor 11 may execute computer executable instructions to define baseline conditions of at least one radar area based on normal operating conditions of the machine 9 after Fast Fourier Transform of the baseline data 13 into a radar plot. According to one embodiment, the processor 11 continuously Fast Fourier Transforms the monitoring data 14 stored in memory 12 into radar points that define a radar plot. The processor 11 may monitor changes in areas of the radar plot over time by comparing radar areas of transformed baseline data 13 with radar areas of transformed monitoring data 14. The processer 11 may be configured to determine when values of the radar areas have changed from baseline conditions by threshold amounts. Thus, the system of the presently disclosed invention allows for real-time monitoring of abnormal machine operating behavior whenever the values of the radar areas change from baseline conditions by incremental amounts.

In other embodiments, the system may further comprise a viewer 16 that is responsive to output signals from an output device. The viewer 16 may display a visual image of the radar plot. The visual image may comprise, but is not limited to, a simple radar plot, radar ripple plot, or 3-dimensional radar plot. In an embodiment, the viewer 16 also may display text describing the abnormal behavior detected, any associated alarm level, and/or any recommended actions. Recommended actions may include, but are not limited to, adjust, align, balance, or examine the machine part(s), check for and remove obstructions, repair or replace a component, and/or tighten or align the machine part(s).

In other embodiments of the presently disclosed invention, the systems and methods may also notify a user of an abnormal behavior of machine 9 through electronic mail (e-mail), text message, paper printout, or any other available methods of communication.

In one embodiment, the sensing device 10 may be attached to a structure to measure vibration, sound, pressure, temperature, or other conditions wherein an abnormal condition of a structure may be detected. A structure includes, but is not limited to, a building, roadway, bridge, tunnel, railway, dam, canal, power station, pipeline, retaining wall, offshore structure, and load bearing wall, beam, column, truss, or brace. The systems and methods of the present invention may monitor one or more conditions of a structure and may generate waveform data in response to monitored structure conditions. The systems and methods of the present invention may monitor changes in radar areas from baseline conditions by threshold amounts to determine whether an abnormal condition in the structure is present.

Processor 11 may be one or more microprocessors, an application specific integrated circuit (ASIC), a circuit containing one or more processing components, a group of distributed processing components, circuitry for supporting a microprocessor, or other hardware configured for processing data. Processor is also configured to execute computer code stored in memory 12 to complete and facilitate the activities described herein.

I/O devices (including, but not limited to, keyboards, displays, pointing devices, DASD, tape, CDs, DVDs, thumb drives and other memory media, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards may be just a few of the available types of network adapters.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "system." Furthermore, the presently disclosed invention may take the form of a computer program product embodied in any tangible medium of expression having computer useable program code embodied in the medium.

Any combination of one or more computer useable or computer readable medium(s) may be utilized. The computer-useable or computer-readable medium may be, for example but not limited to, an electronic, magnetic, optical, electromagnetic, infrared, or semiconductor system, apparatus, device, or propagation medium. Computer-readable medium may also be an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a digital versatile disk (DVD), a memory stick, a floppy disk, a mechanically encoded device such as punch-cards or raised structures in a groove having instructions recorded thereon, and any suitable combination of the foregoing. Note that the computer-useable or computer-readable medium may be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-useable or computer-readable medium may be any medium that can contain, store, communicate, propagate, or transport the program for use by or in connection with the instruction execution system, apparatus, or device. The computer-useable program code may be transmitted using any appropriate medium, including but not limited to wireless, wireline, optical fiber cable, RF, etc.

Computer program code for carrying out operations of the presently disclosed invention may be written in any combination of one or more programming languages. The programming language may be, but is not limited to, object-oriented programming languages (Java, Smalltalk, C++, etc.) or conventional procedural programming languages ("C" programming language, etc.). The program code may execute entirely on a user's computer, partly on the user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, which may include through the Internet using an Internet Services Provider. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Embodiments of the presently disclosed invention are described with reference to flowchart illustrations and/or block diagrams of methods, systems, and computer program products according to embodiments of the presently disclosed invention. It will be understood that each block of the flowchart illustrations and/or block diagrams, and combination of blocks in the flowchart illustrations and/or block diagrams, may be implemented by computer program instructions. These computer program instructions may be provided to a processor of a general purpose computer, special purpose computer, or other programmable data processing apparatus to produce a machine, which the instructions execute via the processor of the computer or other programmable data processing apparatus allowing for the implementation of the steps specified in the flowchart and/or block diagram blocks or blocks.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others.

Definitions

Unless otherwise defined, all terms (including technical and scientific terms) used herein have the same meaning as commonly understood by one of ordinary skill in the art to which this disclosure belongs. As such, terms, such as those defined by commonly used dictionaries, should be interpreted as having a meaning that is consistent with their meaning in a context of a relevant art and should not be interpreted in an idealized or overly formal sense unless expressly so defined herein.

As used herein, the term "machine" includes a solid article consisting of parts, or of certain devices and combination of devices. This includes but is not limited to, every mechanical device or combination of mechanical powers and devices to perform some function and produce a certain effect or result.

As used herein, the term "radar plot" includes a "spider plot", "spider chart", or "radar chart" and plots one or more series of values over multiple quantitative variables compared on a two-dimensional plane.

As used herein, the term "and/or" includes any and all combinations of one or more of the associated listed items. Likewise, as used in the following detailed description, the term "or" is intended to mean an inclusive "or" rather than an exclusive "or." That is, unless specified otherwise, or clear from context, "X employs A or B" is intended to mean nay of the natural inclusive permutations. Thus, if X employs A; X employs B; or X employs both A and B, then "X employs A or B" is satisfied under any of the foregoing instances.

The terminology used herein is for the purpose of describing particular examples only and is not intended to be limiting. As used herein, the singular forms "a", "an", and "the" may be intended to include the plural forms as well, unless the context clearly dictates otherwise. As example, "a" machine part may comprise one or more parts, and the like.

The terms "comprises", "comprising", "including", "having", and "characterized by", may be inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms may be to be understood as a non-restrictive term used to describe and claim various aspects set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics may be excluded from such an embodiment, but any compositions, materials, components, elements, features, integers, operations, and/or process steps that do not materially affect the basic and novel characteristics may be included in the embodiment.

Any method steps, processes, and operations described herein may not be construed as necessarily requiring their performance in the particular order discussed or illustrated, unless specifically identified as an order of performance. It is also understood that additional or alternative steps may be employed, unless otherwise indicated.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included may be combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Aspects of the present disclosure may be described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Words such as "then," "next," etc. are not intended to limit the order of the steps; these words may be simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

In the description, certain details are set forth in order to provide a better understanding of various embodiments of the systems and methods disclosed herein. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

While specific aspects of the disclosure have been provided hereinabove, the disclosure may, however, be embodied in many different forms and should not be construed as necessarily being limited to only the embodiments disclosed herein. Rather, these embodiments may be provided so that this disclosure is thorough and complete, and fully conveys various concepts of this disclosure to skilled artisans.

Note that various terminology used herein may imply direct or indirect, full or partial, temporary or permanent, action or inaction. For example, when an element is referred to as being "on," "connected" or "coupled" to another element, then the element may be directly on, connected or coupled to the other element or intervening elements may be present, including indirect or direct variants. In contrast, when an element is referred to as being "directly connected" or "directly coupled" to another element, there may be no intervening elements present.

Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

All numerical quantities stated herein may be approximate, unless stated otherwise. Accordingly, the term "about" may be inferred when not expressly stated. The numerical quantities disclosed herein may be to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, the term "about" refers to values within an order of magnitude, potentially within 5-fold or 2-fold of a given value. Notwithstanding the approximations of numerical quantities stated herein, the numerical quantities described in specific examples of actual measured values may be reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges may be continuous and include every value between the minimum and maximum values. Any maximum numerical limitation recited herein is intended to include all lower numerical limitations. Any minimum numerical limitation recited herein is intended to include all higher numerical limitations.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, may be at least partially performed via at least one entity or actor in any manner.

All documents cited herein may be incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that may be within the scope of this application.

EXAMPLES

EXAMPLE 1: Waveform data was collected from an exhaust fan in a paint shop using the systems and methods of the presently disclosed invention. Baseline data was collected over several days of normal operating. Monitoring data was collected over several months. The monitoring period was followed by a time gap of four months where the figures illustrate that the fan was shut down. The recorded data includes an FFT radar plot that evidences an unbalanced condition in the fan before shutdown.

After the four-month shutdown, inspection revealed that the unbalanced condition was caused by paint collecting on the fan blades. It was recommended to address the fan imbalance by cleaning the fan blades at a convenient opportunity since the unbalanced condition had not yet reached an alarm threshold.

According to the example, the paint on the fan blades completely dried during the shutdown. When the fan was restarted, the previous recommendation to clean the fan blades was ignored, and the fan was restarted without cleaning. Upon restart, chunk(s) of dried paint flew off the fan blades, creating an unbalanced condition that deteriorated very rapidly to an alarm condition and then to an urgent condition as the fan continued to run. The fan exceeded the critical level before it was finally shut down for repair. However, by that time, the fan not only required cleaning, but the bearings had been so damaged that the repair was more costly than if the problem had been addressed at an earlier time.

The methods and systems of the present disclosure identify the imbalance issue much sooner than the prior art. FIGS. 3-7 illustrate that prior methods and systems did not detect a fan imbalance before the shutdown, so there was no warning before the fan restart.

Figure 3:
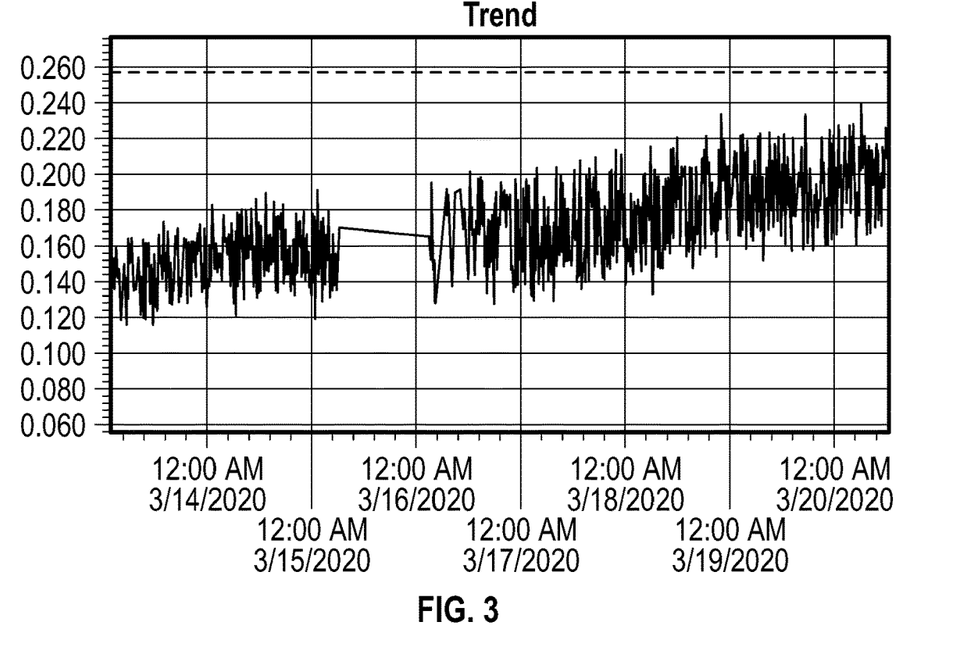
FIG. 3 depicts a plot of one times turning speed that is typically used in the prior art to determine whether a rotating machine such as a fan is unbalanced.
Figure 4:
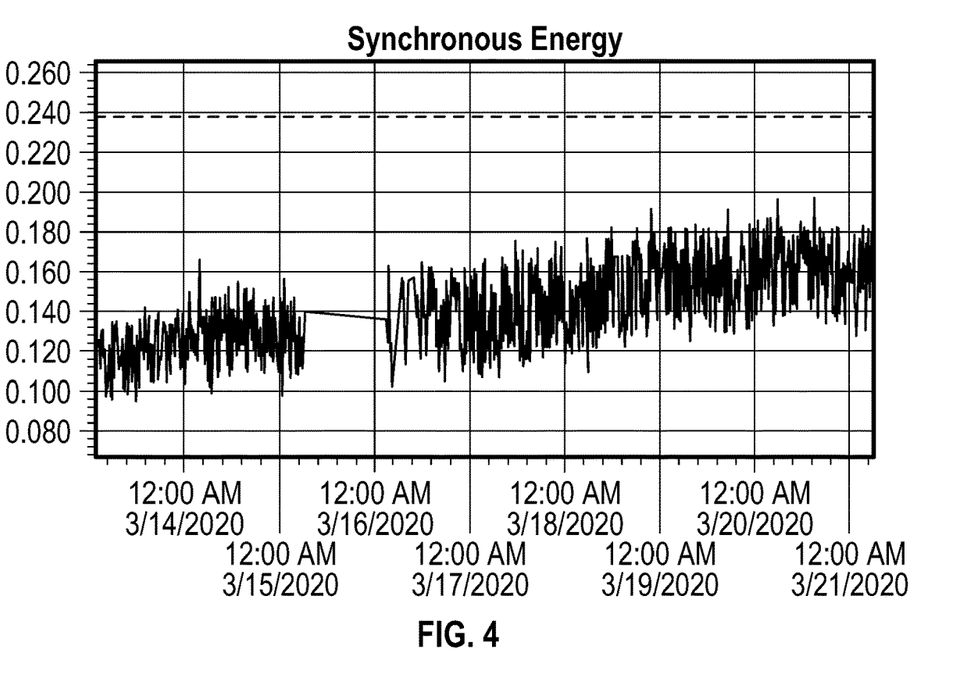
FIG. 4 illustrates a synchronous energy trend plot typically considered by the prior art.
Figure 5:
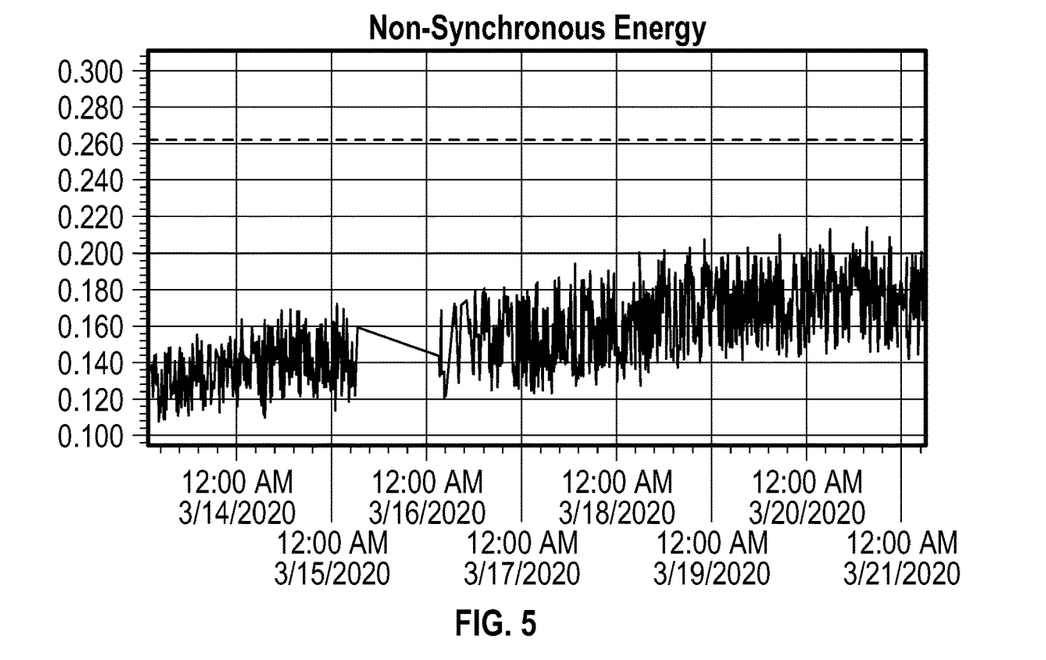
FIG. 5 depicts a total non-synchronous energy trend plot typically considered by the prior art.

FIG. 3 demonstrates a plot of the one times turning speed of the fan. This is a typical plot that is used in the prior art to determine whether a rotating machine such as a fan is unbalanced. In this example, the data prior to shutdown is plotted. Because all the data is below the alert level shown by the dotted line in FIG. 3, nothing in this plot signaled that the fan needs to be serviced.

Figure 6:
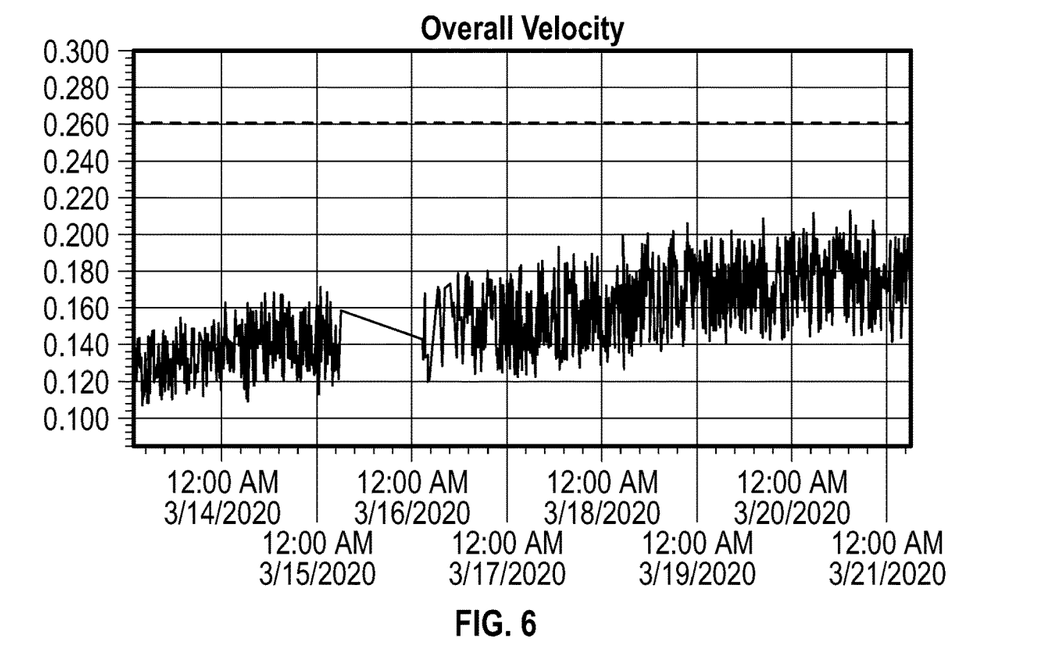
FIG. 6 is an overall velocity trend plot typically considered by the prior art.

Other trend plots typically considered by the prior art monitor synchronous energy (FIG. 4), total non-synchronous energy (FIG. 5), and overall velocity (FIG. 6). None of these plots indicated that the fan required any service or repair. The plots are common traditional vibration analysis trend plots that would be considered for machine screening. None of these plots, either individually or collectively, showed that the fan operation was abnormal. They showed a slight increase in vibration over time, but the vibration levels remained below an alert level that would have prompted a maintenance request.

Figure 7:
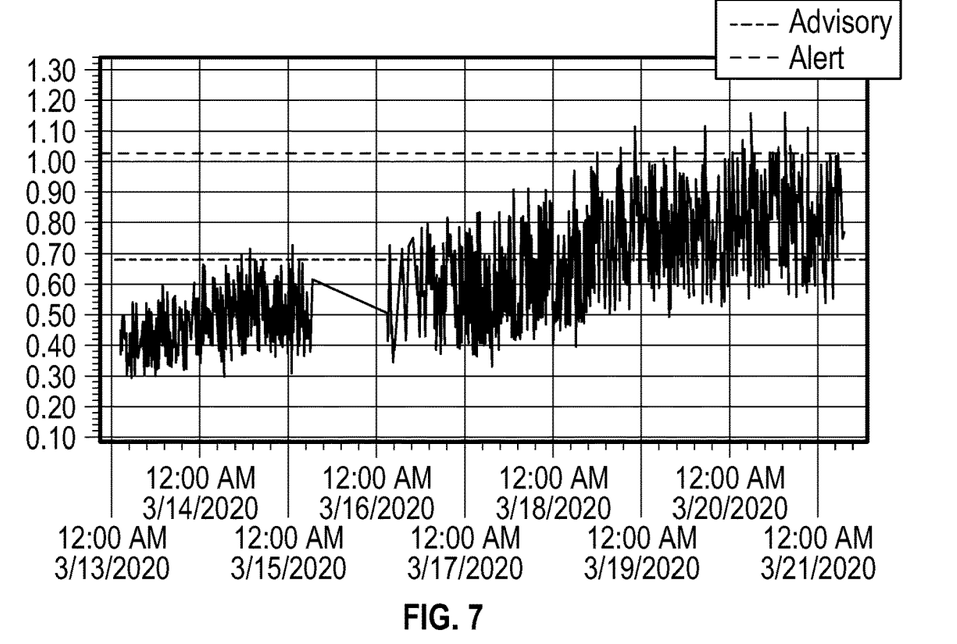
FIG. 7 depicts a trend of the overall Fast Fourier Transform radar plot values using the systems and methods of the presently disclosed invention.
Figure 8:
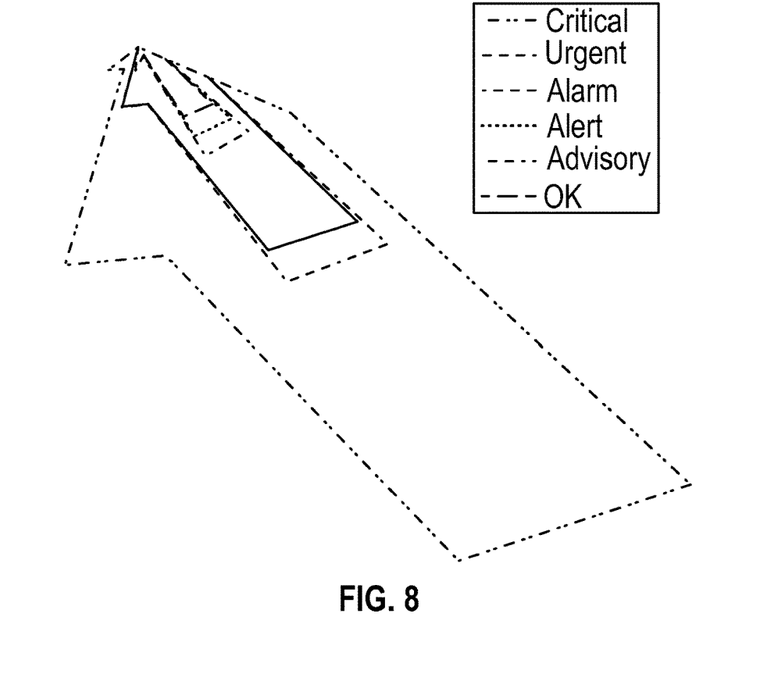
FIG. 8 is a radar ripple plot illustrating an unbalanced condition in a fan using the systems and methods of the presently disclosed invention.
Figure 9:
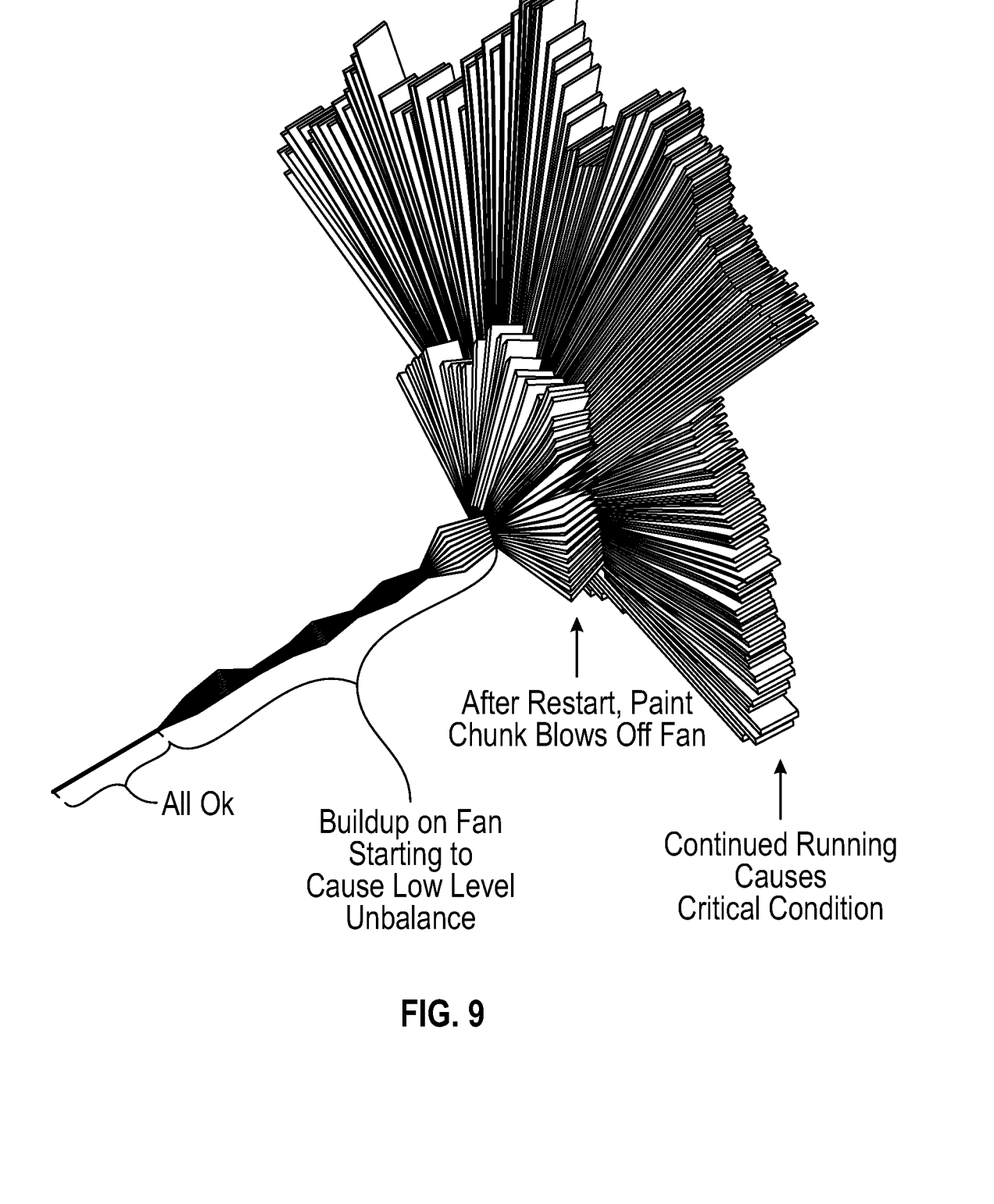
FIG. 9 is a 3-Dimensional radar plot illustrating an unbalanced condition in a fan using the systems and methods of the presently disclosed invention.

FIGS. 7-9 illustrate that the methods and systems of the presently disclosed invention integrate additive FFT radar plots to achieve a result that was different from the forgoing prior art methodologies and systems. The methods and systems of the presently disclosed invention identified that there was a malfunction in the fan because they combined FFT radar plot changes for many different FFT related values and banding algorithms. The result was that the fan degradation was revealed much sooner.

FIG. 7 is a trend of the overall FFT radar plot values. For the period before shutdown, it demonstrates that the data exceeded the advisory level so that maintenance should be performed when convenient. After the shutdown, it shows that the data exceeded the alert level so that the need for maintenance was more urgent.

FIG. 8 is a "radar ripple" plot that illustrates the unbalanced condition of the fan. FIG. 8 demonstrates the several states of unbalance of the fan as they are plotted together. In this context, the area differences correspond from one operating state to the next. This graphic enables visualization of the different stages of operational decay of the fan. Generally, the methods and systems of the presently disclosed invention does not require publication of the FFT radar plots in such visual formats that are observable by the user.

FIG. 9 is a 3-Dimensional radar plot that illustrates a visual equivalent of processed data that reflects the malfunction of the fan as explained in the forgoing example of the fan. While such a plot that is visually perceptible to human users is not required for the presently disclosed embodiment of the invention, this illustration aids appreciation of the benefit of the FFT radar technique detecting abnormal machine operation. In FIG. 9, the electronic equivalent of the illustration was provided to an appropriate electronic processor that determines the various stages of the fan imbalance and function impairment without human intervention.

What is claimed is:

1. A method for identifying abnormal operation of a machine, the method comprising:
   generating a monitoring signal while the machine is in operation;
   collecting waveform data from the monitoring signal;
   establishing an operational baseline of the machine;
   processing the waveform data into a radar plot;
   determining an area of the radar plot; and
   correlating changes in the area with changes in operation of the machine.

2. The method of claim 1, wherein collecting waveform data from the monitoring signal comprises monitoring two or more spectrums in the monitoring signal to collect waveform data.

3. The method of claim 2, wherein processing the waveform data into said radar plot further comprises identifying a respective energy level in each of the two or more spectrums; and processing waveform data corresponding to each of the energy levels into a radar plot, wherein the radar plot is a Fast Fourier Transform radar plot.

4. The method of claim 1, wherein the radar plot is a Fast Fourier Transform radar plot.

5. The method of claim 1, wherein the radar plot is a Fourier Transform radar plot.

6. The method of claim 1, wherein processing the waveform data into said radar plot comprises analyzing spectral trend or waveform trend parameters.

7. The method of claim 1, further including displaying the radar plot as an optical expression selected from a group consisting of a simple radar plot, a radar ripple plot, and a 3-dimensional radar plot.

8. The method of claim 1, wherein an increase in the area of a smart region of the radar plot over time corresponds to an abnormal operating condition of the machine.

9. The method of claim 8, wherein variations in baseline waveform data establish the at least two alarm limits.

10. The method of claim 8, wherein the at least two alarm limits adapt to a specific machine part.

11. The method of claim 1, wherein the radar area includes at least two alarm limits that correspond to at least one operating state of the machine.

12. A method for identifying an abnormal structural condition of a structure, the method comprising:
    generating a monitoring signal;
    collecting waveform data from the monitoring signal;
    establishing an operational baseline of the structure processing the waveform data into a radar plot;
    determining an area of the radar plot; and
    correlating changes in the area with the abnormal structural condition of the structure.

13. A system for identifying abnormal behavior of a machine, the system comprising: a sensing device that monitors at least one operating behavior of the machine, wherein the sensing device generates waveform data;
    a memory for storing the waveform data, an electronic data processor that in communication with the memory and the sensing device, the data processor being configured cooperate with the sensing device and the memory to:
    analyze the waveform data;
    define a baseline condition of the waveform data;
    determine a radar area from the waveform data;
    monitor changes in the waveform data; and
    determine when the radar area changes from the baseline condition by a threshold amount.

14. The system of claim 13, wherein analyze the waveform data comprises determine selected energy points within the waveform data and combine the selected energy points to determine at least one radar area that defines an operating behavior of the machine.

15. The system of claim 13, wherein the sensing device, memory and processor cooperate to: identify at least one spectral band within two or more respective spectrums, each of the spectral bands being associated a with respective component parts of the machine; establish the energy level within each of the spectral bands as a respective radar band point; and
    plot said radar band points of each band to define a radar plot having an area.

16. The system of claim 13, further including an output device that cooperates with the processor to transmit a notification signal that at least one abnormal behavior of said machine has been detected.

17. The system of claim 16, wherein the system further includes a viewer that is responsive to output signals from the output device such that the viewer displays a visual image of the radar area.

18. The system of claim 17, wherein said visual image is selected from a group consisting of a simple radar plot, a radar ripple plot, and a 3-Dimensional radar plot.

19. The system of claim 16, wherein the system further includes a viewer that is responsive to output signals from the output device such that the viewer displays a notification selected from the group consisted of: at least one abnormal behavior, at least one alarm level, and at least one recommended action.

20. The system of claim 16, wherein the system further includes a viewer that is responsive to output signals from the output device such that the viewer displays a notification selected from the group consisted of: at least one abnormal behavior, at least one alarm level, and at least one recommended action.

* * * * *